(12) United States Patent
Tusha et al.

(10) Patent No.: US 11,979,267 B2
(45) Date of Patent: May 7, 2024

(54) METHOD FOR PROVIDING MULTI-USER SINGLE-CARRIER TRANSMISSION WITH A SMART FRAME

(71) Applicant: Istanbul Medipol Universitesi, Istanbul (TR)

(72) Inventors: Armed Tusha, Istanbul (TR); Seda Dogan, Istanbul (TR); Hüseyin Arslan, Istanbul (TR)

(*) Notice: Subject to any disclaimer, the term of this patent is extended or adjusted under 35 U.S.C. 154(b) by 35 days.

(21) Appl. No.: 17/786,328

(22) PCT Filed: Dec. 2, 2020

(86) PCT No.: PCT/TR2020/051211
§ 371 (c)(1),
(2) Date: Jun. 16, 2022

(87) PCT Pub. No.: WO2021/133311
PCT Pub. Date: Jul. 1, 2021

(65) Prior Publication Data
US 2023/0362045 A1   Nov. 9, 2023

(30) Foreign Application Priority Data
Dec. 24, 2019 (YE) ................. 2019/21291

(51) Int. Cl.
*H04L 27/26* (2006.01)
(52) U.S. Cl.
CPC ........ *H04L 27/264* (2013.01); *H04L 27/2605* (2013.01); *H04L 27/2636* (2013.01)

(58) Field of Classification Search
CPC ............... H04L 27/264; H04L 27/2605; H04L 27/26265; H04L 27/2636
See application file for complete search history.

(56) References Cited

U.S. PATENT DOCUMENTS

| 2016/0094318 | A1 | 3/2016 | Shattil | |
| 2019/0052495 | A1* | 2/2019 | Kim | H04L 25/03834 |
| 2021/0344535 | A1* | 11/2021 | Sridharan | H04L 27/26265 |

FOREIGN PATENT DOCUMENTS

| CN | 101345732 A | 1/2009 |
| CN | 101345731 B | 6/2012 |

OTHER PUBLICATIONS

International Search Report for corresponding PCT/TR2020/051211 dated Mar. 30, 2021.
Written Opinion of the International Searching Authority for corresponding PCT/TR2020/051211 dated Mar. 30, 2021.

* cited by examiner

*Primary Examiner* — Khanh C Tran
(74) *Attorney, Agent, or Firm* — Egbert, McDaniel & Swartz, PLLC

(57) ABSTRACT

The method is related to the smart frame design that contains multi-user single-carrier (SC) transmission to support 5G-and-beyond communication systems that permit enhanced mobile broadband (eMBB), massive machine-type communication (mMTC), and ultra-reliable low-latency communication (URLLC) services. The method enhances the capacity of the system in line with the filter parameters to be selected according to the user's requirements and to meet the requirements of the desired and adjacent users.

2 Claims, 6 Drawing Sheets

METHOD FOR PROVIDING MULTI-USER SINGLE-CARRIER TRANSMISSION WITH A SMART FRAME

TECHNICAL FIELD

The present invention relates to a smart frame that provides service to users through single carrier (SC) transmission to support 5G-and-beyond communication systems that enable enhanced mobile broadband (eMBB), massive machine-type communication (mMTC), and ultra-reliable-low latency communication (URLLC) services.

PRIOR ART

In the next decade, current communication systems are required to be improved to meet the exponential growth expected in the volume of data traffic through various applications and use. Designing novel radio access technologies (RAT) is an important factor in supporting the demands of 5G-and-beyond wireless communication systems. eMBB services are advanced communication systems and require higher data rates. Therefore, it is mandatory to achieve novel transmission schemes that provide spectral efficiency (SE). On the other hand, for mMTC systems, it is mandatory to provide novel network designs that enable users of massive machine-type communications to access low power consumption and sporadic transmission with small packets. URLLC represents the most critical services of the new generation networks due to its ultra-reliability and low latency demands. Therefore, novel communication systems that are flexible and adaptable are required to meet a variety of requirements for upcoming information technologies. However, the use of only orthogonal frequency division multiplexing (OFDM) limits the flexibility of current communication systems. SC transmission is regarded as a promising solution for 5G-and-beyond communication systems due to its flexible structure. A block diagram for the SC transmission is illustrated in FIG. 1. In the known SC transmission communication, an incoming message is firstly converted into data bits (1 or 0) and then into symbols by using known modulation techniques. Afterward, the symbols are filtered to be air transmitted through pulse shaping. The filter used most in communication systems is the raised cosine (RC) filter. The RC filter is a Nyquist filter and it maintains inter-pulse orthogonality. It has been proven in literature that channel effects can be compensated by designing a communication system containing a transmitter and receiver properly. Therefore, an end-to-end RC filter is obtained by using a square-root raised cosine (SRRC) filter in the transmitter and receiver. Time and frequency responses of the RC filter are shown in FIG. 2 and FIG. 3. The time and frequency responses of the RC filter are defined with the coefficients including the filter span by symbol digits, roll-off parameter, and oversampling rate required for a symbol. Producing the perfect RC filter requires infinite time and in reality it is impossible to achieve this. Therefore, as shown in FIG. 2, truncation is applied to the RC filter according to the desired filter span ($\xi$). However, the truncation process leads to inter-symbol interference (ISI) within the block. A high $\xi$ value causes an inefficient usage in time while it was shown in a study [1] that it provides high signal-to-interference-plus-noise ratio (SINR) and low out-of-band-emission (OOBE). As shown in FIG. 3, the roll-off parameter roll-off parameter ($\alpha$) defines the occupied bandwidth of a transmitted signal in the frequency and the energy of side lobes of the filter in time. A high $\alpha$ value leads to a SE decrease in the frequency plane while it reduces the energy of side lobes and the ISI resulting from the truncation and while it enhances the reliability of the system.

In the SC systems currently used, the modulated symbols contained in a block are subjected to a pulse shaping process through the use of the same square-root raised cosine filter (SRRC) in the transmitter. This process is shown in FIG. 4. In the study [1], to increase the SE and to reduce the OOBE, the use of small ($\alpha$) values for the symbols located in the middle section of the block and of large ($\alpha$) values for the symbols located on sides of the block was suggested and the related performance was presented. However, such an increase in the SE was made for a constant SINR and a user. Moreover, in the study [1], increasing the $\alpha$ value from middle symbols to side symbols in an effort to reduce the efficiency loss was suggested while meeting the needs of a user who has ultra-reliable-low-latency communication (URLLC). Even though the selected ($\alpha$) values were suitable for a user, no idea was given about their effects on the performance of the other users that were present in a given frame and what effects they had on the performance within the frame. In conventional SC communication, the SRRC filter with the same $\alpha$ value was used to transmit the symbols within a block (Study [2]). The use of high $\alpha$ value increases reliability by reducing the ISI, however, on the other hand, SE reduces reliability. For novel use cases and applications of 5G-and-beyond communication systems, high reliability, low latency, and the frame structures that provide service to multiple users simultaneously in addition to the SE are required. In current communication systems, latency is compromised in order to achieve high reliability. However, for the URLLC that provides 5G-and-beyond service, the requirements regarding high reliability and low latency should be met simultaneously. On the other hand, current communication systems have been designed for inter-human communication.

However, the mMTC is an inter-machine communication and it must carry out communication that permits multiple machines to connect to the network simultaneously.

Along with the aforementioned problems, the inadequacy of current communication systems has made it mandatory to provide novel frame structures that are capable of providing service to a plurality of users.

BRIEF DESCRIPTION OF THE INVENTION

The present invention is related to a method that enables multi-user single-carrier transmission through the use of a smart frame in order to eliminate the aforementioned drawbacks and to provide novel advantages to the related art.

The main aim of the invention is to provide a frame that offers a smart frame structure by performing an appropriate pulse shaping process by adaptively selecting the block size, roll-off parameter, and filter length for SC transmission in accordance with the demands of the desired user and adjacent users, present in a frame, and thereby allowing the SC communication to be used for 5G-and-beyond applications.

Another aim of the invention is to provide a frame that enables controlling the transmission latency caused by the block size, filter length, and roll-off parameter.

A further aim of the invention is to provide a frame that allows controlling of a self-interference resulting from a truncation process by selecting the accurate parameter.

Yet another aim of the invention is to provide a frame that allows user interference to increase the SE and enables such interference to be controlled by selecting the accurate parameter.

Another aim of the invention is to develop a frame that enables the OOBE to be controlled.

A further aim of the invention is to provide a frame that enables current sources to be used more efficiently in the time and frequency planes and thus the efficiency to be enhanced.

Yet another aim of the invention is to develop a frame that ensures a simple design of the massive machine-type communication.

A further aim of the invention is to configure a frame that provides flexible and transient data blocks for ultra-reliable and low-latency communication (URLLC).

In the method subject to the invention, different block designs for different users are offered in an attempt to consider and meet the requirements of all of the users present in a frame and to maximize the efficiency in the time and frequency planes within the frame, and a general frame structure has been defined.

To achieve all of the aims that will be apparent from the above mentioned information and detailed description given below, the present invention is a method for single-carrier transmission that provides service to multiple users with the smart frame supporting the applications of the eMBB, mMTC, and URLLC services. Accordingly, the method comprises the following process steps;

converting a message into data bits with "1" and/or "0" bits by an information source (1) that intends to send a message, converting the data bits into symbols, performing pulse shaping with a transmitter SRRC filter by applying the following process steps, determining the time and band span of a signal in time and frequency and its out-of-band emission (OOBE) and characteristics by means of the roll-off parameter used in pulse shaping, determining inter-user guard band and aliasing rate by means of the roll-off parameter, filter length, and block size used in pulse shaping, controlling the OOBE and PAPR levels for user's requirements by means of the roll-off parameter, filter length, and block size used in pulse shaping, controlling the inter-user interference by means of the guard band and aliasing rate, determining different $\alpha$ values that need to be used within a block according to the requirements of the desired user and adjacent users, transmitting the signal transmitted by the transmitter SRRC filter to the receiver SRRC filter over a Rayleigh distribution channel by adding noise onto the signal, conversion of the symbols received, by a decision-making device, into data bits The filter parameters that are selected according to the users' requirements enhance the capacity of the system while they attempt to meet these requirements.

Embodiments and additional members of the present invention should be evaluated in conjunction with the accompanying drawings described in detail below in order to better understand the advantages of the invention.

REFERENCE NUMBERS

Figure 1:
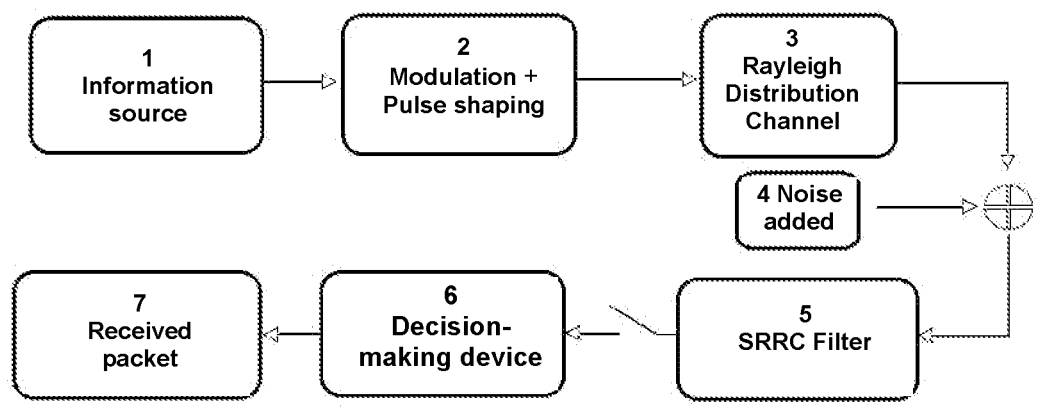
FIG. 1 shows a block diagram illustrating communication via a single-carrier (SC) transmission.
Figure 2:
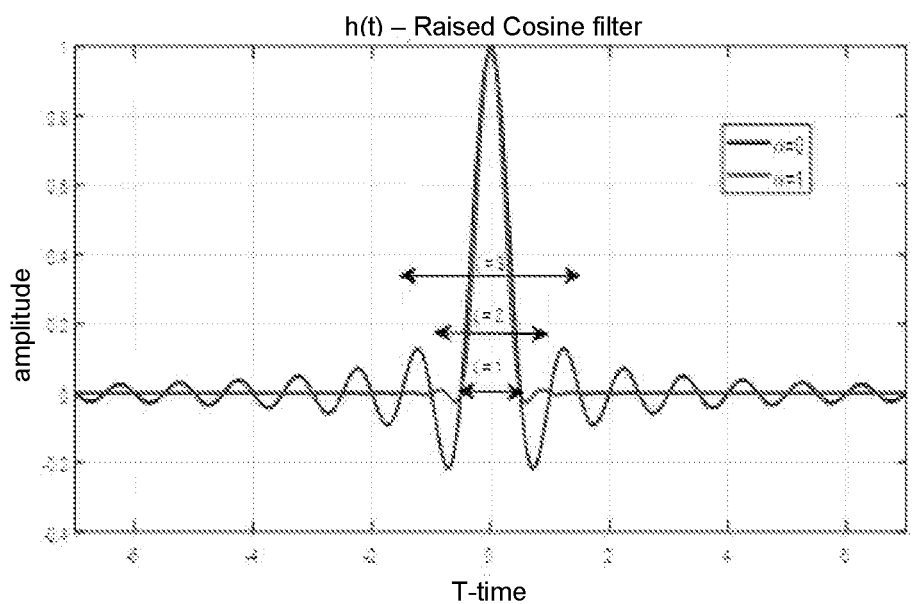
FIG. 2 shows a diagram illustrating a RC filter time response for roll-off parameter roll-off parameter ($\alpha$=0 & $\alpha$=1) and different filter lengths ($\xi$).
Figure 3:
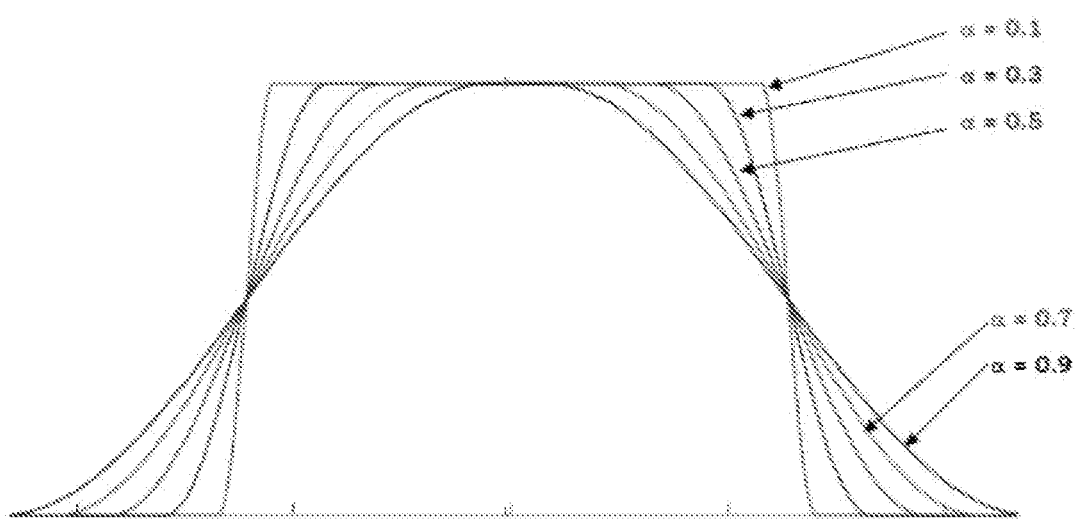
FIG. 3 shows a diagram illustrating the RC filter frequency response for different roll-off parameters roll-off parameter ($\alpha$).
Figure 4:
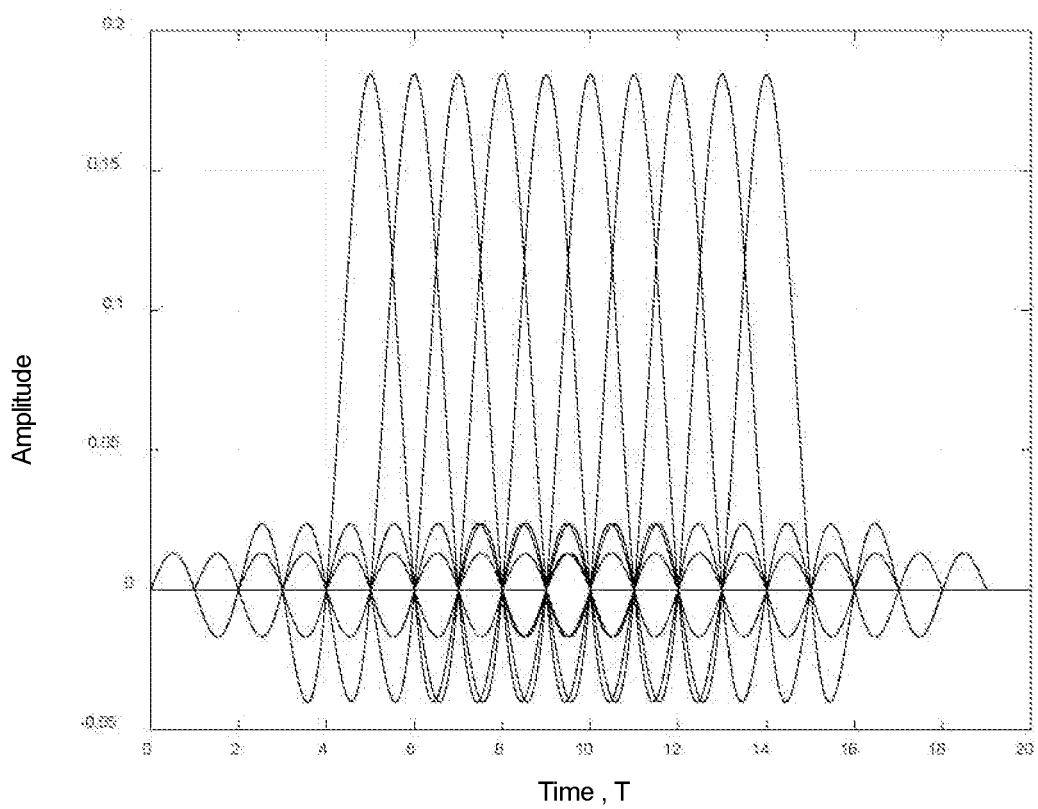
FIG. 4 shows a view of a conventional SC transmission through the use of the same SRRC filter ($\alpha$=0) within a block.

1. Information resource
2. Transmitter SRRC filter
3. Rayleigh distribution channel
4. Noise
5. Receiver SRRC filter
6. Decision-making device
7. Received packet
$\alpha$: Roll-off parameter
$\xi$: Filter length
eMBB: Enhanced Mobile Broadband
mMTC: Massive Machine-Type Communication
URLLC: Ultra-Reliable Low Latency Communication
SE: Spectral Efficiency
SRRC: Square-Root Raised Cosine filter
RRC: Root Raised Cosine filter
SINR: Signal-to-Interference-Plus-Noise Ratio
OOBE: Out-Of-Band-Emission
PAPR: Peak-to-Average Power Ratio
IBI: Inter-Blok Interference
ISI: Inter-Symbol Interference

DETAILED DESCRIPTION OF THE INVENTION

In this detailed description, the novelty subject to the invention is described by means of non-limiting examples only in an effort to help the subject matter to be better understood.

Figure 5:
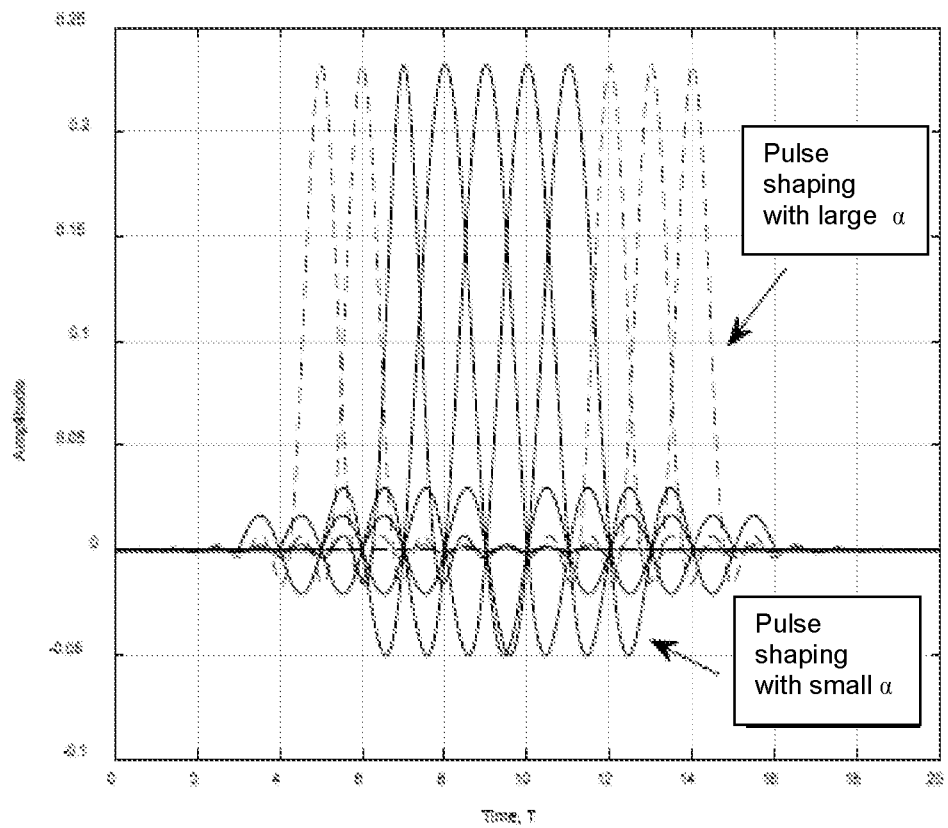
FIG. 5 shows a diagram representing an adaptive usage of the roll-off parameter roll-off parameter (for side symbols $\alpha$=1=and middle symbols ($\alpha$=0).
Figure 6:
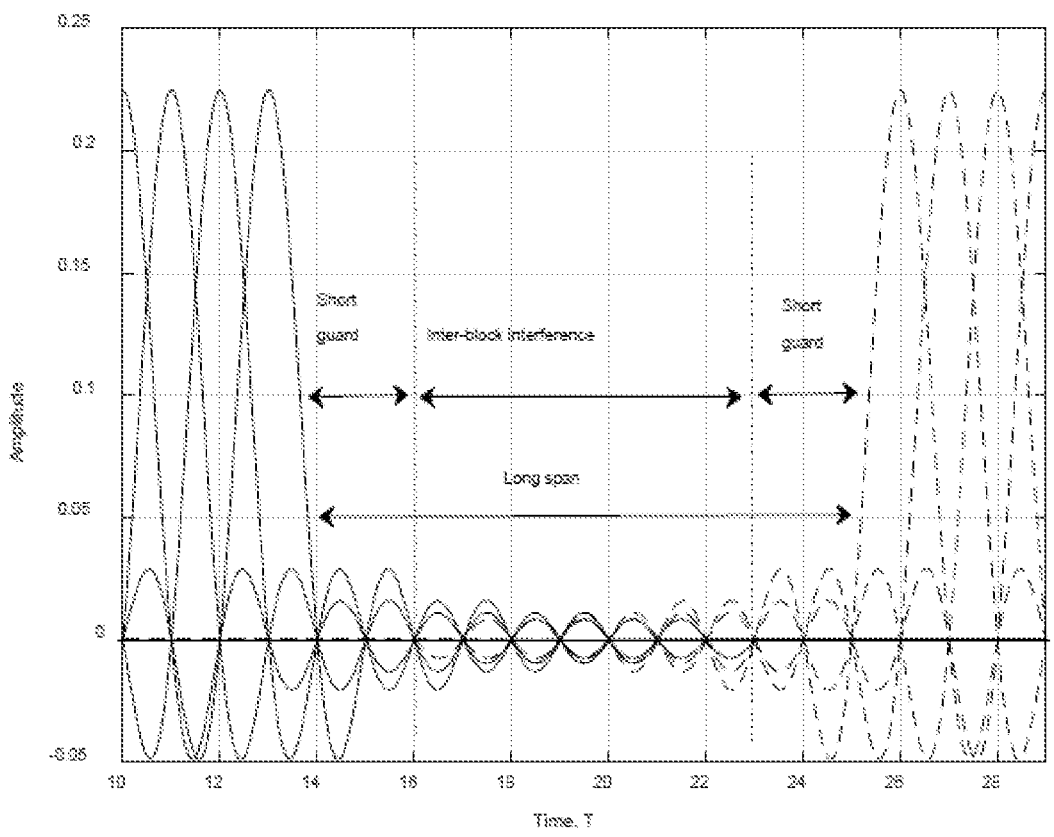
FIG. 6 shows a diagram illustrating the adjustment of the filter length and guard span within the SC frame recommended in the time plane adaptively according to the users' requirements, and the IBI control thereof.

The invention provides a smart frame that enables the SC transmission by taking the demands of adjacent users in the time and frequency into account. Adaptive use of a for a block given in a frame is shown in FIG. 5. Additionally, different a$\epsilon$[0, . . . 1] values for each symbol must be selected by considering the application and use cases of adjacent users as well as the user. The invention considers the demands of the users present, in a given frame by flexibly adjusting the use of radio resources, block size, side and middle pulse rates, roll-off parameter, filter length, inter-user guard span in time and frequency planes and inter-user power difference, and controls the ISI, IBI, OOBE, and PAPR for the users. In FIG. 6, an exemplary case related to the layout of two users and adaptive parameters for the users' layout within the frame is shown. The filter parameters selected according to the users' requirements enhance the capacity of the system and attempt to meet these requirements as well.

To obtain a Nyquist filter in the receiver, the SRRC filter is used in the transmitter and receiver. The roll-off parameter (α), which is one of the parameters of the SRRC filter, decides the long span of the signal in the frequency. The band filled in the frequency for the given roll-off parameter is BW=R*(1+α). R is the transmission data rate. If the roll-off parameter is greater, the band used is large-sized and the energy distributed to side lobes of the filter is collected. Thus, in case of interference, the user will be exposed to less ISI and the emission to side lobes will be lower. Being exposed to lower ISI in time enhances the self-reliability of the user while reliability is also enhanced for other adjacent users with lower OOBE. However, to enhance the SE, in other words, to dedicate fewer resources to a user, the roll-off parameter needs to be set to a lower value. Therefore, the roll-off parameter needs to be selected to be able to enhance the SE and to ensure the reliability of the user.

Another parameter of the SRRC filter is the filter length. The amount of the symbol span covered by the filter represents its length. The processing period for a long filter response takes longer time. This increases the latency for transmission. If the user demands rapid transmission, the filter must not be long. The filter length should be selected by considering the latency level that the user consents to. In other words, the roll-off parameter and the filter length, each of them being a filter parameter, have a direct correlation with each other.

Additionally, the symbols present on the sides lead to OOBE more than the symbols that are present within the block of a user [3]. Therefore, different roll-off parameters must be used within a block. If the users demand high reliability, high roll-off parameter must be used for the symbols present on the side of the block to reduce the OOBE. If it is desired to enhance the SE, the users' signals can be transmitted by partially being overlaid. However, inter-user aliasing compromises users' reliability. In this case, the amount of aliasing must be selected in line with the reliability requirements of the user.

The information resource (1) shown in FIG. 1 converts a desired digital and/or analog message into data bits through the use of logical "1" and logical "0" bits. The bits are converted into symbols by means of modulation techniques and transmitted by performing pulse shaping in the transmitter SRRC filter (2). The invention performs pulse shaping flexibly by considering the requirements of different users. The frame intended to be formed is obtained by being correlated with the users' requirements and the ISI, IBI, OOBE, and PAPR at different levels by considering different block sizes, roll-off parameters, filter lengths, inter-user guard bands or aliasing amounts, and inter-user power differences. Pulse shaping determines the period of the signal in the time and frequency, the band, OOBE and its characteristics. Our invention uses the symbols of low α values that are located within the block and the symbols of high α values that are located at the sides of the block for pulse shaping. Different α values that need to be used within a block are determined considering the requirements of the desired user and adjacent users. FIG. 5 shows as an example the SC block that uses two different values for the middle and side symbols. In FIG. 6, the aliasing amount of the signals is calculated by considering the long span and inter-user interference. The interference amount changes the achievable reliability for the users while the aliasing amount provides the SE. While meeting user requirements, the power difference between users is also considered in parameter selection. The interference of a user having low power interference because of another user having high power causes the transmission of the user having low power to be failed. After the signal leaves the transmitter SRRC filter (2), it passes through the Rayleigh distribution channel (3) and reaches the receiver SRRC filter (5). Before reaching the receiver SRRC filter (5), the signal is exposed to a channel effect, and noise (4) is added to the signal. The symbols received by the receiver SRRC filter (5) are converted into data bits by the decision-making device (6).

REFERENCES

[1]—A. Tusha, S. Doğan and H. Arslan, "Single Carrier Transmission for URLLC with Adaptive Radio Resource Utilization," IWCMC, Tangier, Morocco, 2019, pp. 26-30.

[2]—K. S. Thyagarajan, "Introduction to Digital Signal Processing Using MATLAB with Application to Digital Communications," Springer International Publishing AG, San Diego, CA, USA, 2019.

[3]—A. Sahin and H. Arslan, "Edge Windowing for OFDM Based Systems," in *IEEE Communications Letters*, vol. 15, no. 11, pp. 1208-1211, November 2011.

The invention claimed is:

1. A method for single-carrier transmission that allows multi-users through the use of a smart frame that supports the applications of enhanced mobile broadband (eMBB), massive machine-type communication (mMTC), and ultra-reliable low-latency communication (URLLC) services, the method comprising the following steps:
    converting a message into data bits with "1" and/or "0" bits by an information source that intends to send a message;
    converting the data bits into symbols;
    performing pulse shaping with a transmitter square-root raised cosine (SRRC) filter by applying the following process steps:
        determining the time and band span of a signal in time and frequency and its out-of-band emission (OOBE) and characteristics by means of the roll-off parameter used in pulse shaping;
        determining inter-user guard band and aliasing rate by means of the roll-off parameter, filter length, and block size used in pulse shaping;
        controlling the OOBE and peak-to-average power ratio (PAPR) levels for user's requirements by means of the roll-off parameter, filter length, and block size used in pulse shaping, and controlling the inter-user interference by means of the guard band and aliasing rate; and
        determining different values that need to be used within a block according to the requirements of the desired user and adjacent users;
    transmitting the signal transmitted by the transmitter SRRC filter to the receiver SRRC filter over a Rayleigh distribution channel by adding noise onto the signal; and
    conversion of the symbols received, by a decision-making device, into data bits.

2. Method according to claim 1, comprising the process step of calculating by the following formula:

BW=$R*(1+α)$ the band filled at the frequency for the roll-off parameter, wherein:
    BW is the bandwidth occupied by the designed signal frame while performing communication between transmitter and receiver;
    R is the transmission data rate; and
    α is the roll-off factor of the SRRC filter.

* * * * *